United States Patent Office 3,642,846
Patented Feb. 15, 1972

3,642,846
ORGANOTIN BIS(MONOALKENYL MALEATES)
Samuel Hoch, Brooklyn, N.Y., assignor to
Tenneco Chemicals, Inc.
No Drawing. Filed Feb. 5, 1969, Ser. No. 796,901
Int. Cl. C07f 7/22; C08f 45/56
U.S. Cl. 260—429.7
4 Claims

ABSTRACT OF THE DISCLOSURE

Polyvinyl chloride resin compositions that contain as stabilizer an organotin compound having the structural formula

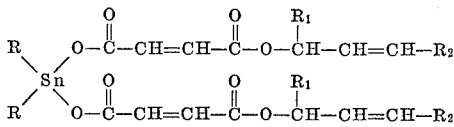

wherein each R represents an alkyl group having from 4 to 8 carbon atoms or a phenyl group; each $R_1$ represents hydrogen or an alkyl group having from 1 to 4 carbon atoms; and each $R_2$ represents methyl or phenyl are characterized by excellent heat stability, resistance to degradation resulting from exposure to ultraviolet radiation, color, and clarity. Illustrative of these organotin compounds is di-n-butyltin bis (monobutenyl maleate).

---

This invention relates to stabilizers for vinyl halide resins and to resinous compositions stabilized therewith. More particularly, it relates to polyvinyl chloride resin compositions that are characterized by excellent heat and light stability, color, and clarity.

It is well known that vinyl halide resins undergo undesirable changes when they are exposed to heat and light and that these changes lead to discoloration and to deterioration of the mechanical properties of the compositions. Since elevated temperatures are required for the processing of these resins and since they are exposed to light when they are subsequently used, it is necessary to incorporate in vinyl halide resin compositions stabilizers that will inhibit or prevent their deterioration when they are exposed to light and to heat.

A large number of compounds have been proposed as stabilizers for vinyl halide resin compositions. In most cases, however, these compounds do not adequately protect the compositions from deterioration resulting from exposure to both heat and light. For example, many organotin compounds are excellent heat stabilizers, but they are not effective in protecting the compositions against deterioration resulting from exposure to ultraviolet and other radiation. Other compounds are effective as light stabilizers, but they do not prevent degradation resulting from the prolonged heating of the resinous compositions.

In accordance with this invention, it has been found that vinyl halide resin compositions that have excellent heat and light stability, color and color retention, clarity, and other valuable properties are obtained by incorporating in the compositions an organotin compound having the structural formula

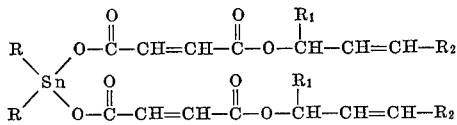

wherein each R represents phenyl or an alkyl group having from 4 to 8 carbon atoms; each $R_1$ represents hydrogen or an alkyl group having from 1 to 4 carbon atoms; and each $R_2$ represents methyl or phenyl.
Illustrative of these organotin compounds are the following: di-n-butyltin bis (monobutenyl maleate), di-n-butyltin bis (monocinnamyl maleate), di-n-butyltin bis (mono-4-hexen-3-yl maleate), di-n-hexyltin bis (mono-2-octen-4-yl maleate), di (2-ethylhexyl)tin bis (mono-3-penten-2-yl maleate), and the like. One of these compounds or a mixture containing two or more of them may be present in the stabilized vinyl halide resin compositions of this invention.

The organotin compounds of this invention may be prepared by any suitable and convenient procedure. For example, they may be prepared by heating the appropriate monoester of maleic acid with a dialkyltin oxide or diphenyltin oxide. This reaction is generally carried out in a solvent, such as benzene, toluene, or xylene.

Only a small amount of the organotin compound need be present in the vinyl halide resin compositions of this invention. It has been found that as little as 1 percent of the stabilizer, based on the weight of the composition, will bring about an appreciable improvement in the heat and light stability of the composition. Approximately 10 percent or more of the stabilizer can be used, but these larger amounts generally do not provide further improvement in the properties of the resinous composition and for this reason are not ordinarily used. While the amount of the stabilizer that will provide optimum heat and light stability depends upon such factors as the choice of stabilizer components and the choice of vinyl halide resin, in most cases approximately 2 percent to 5 percent of the stabilizer, based on the weight of the vinyl halide resin composition, is used.

The vinyl halide polymers that may be employed in the compositions of this invention are the resinous products obtained by the polymerization of a vinyl halide in the presence or absence of a copolymerizable monomer. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those prepared from at least 70 percent of vinyl halide and up to 30 percent of the comonomer. The invention is also applicable to mixtures of polyvinyl chloride in a major proportion with a minor proportion of other synthetic resins, such as chlorinated polyethylene, polyacrylate and polymethacrylate esters, and copolymers of acrylonitrile, butadiene, and styrene.

The invention is of particular value in the stabilization of rigid polyvinyl chloride compositions, that is, compositions which are formulated to withstand temperatures of at least 350° F. The stabilizer systems of this invention can also be used with plasticized vinyl halide resin compositions of conventional formulation where high softening point is not a requisite. Any of the well-known plasticizers for vinyl halide resins can be used including dioctyl phthalate, dibutyl sebacate, tricresyl phosphate, and octyl diphenyl phosphate.

In addition to the ingredients described, the stabilized resinous compositions may contain other resin additives, such as pigments, extenders, lubricants, processing aids, solvents, dyes, and other heat and light stabilizers in the amounts ordinarily employed for the purposes indicated.

The stabilized vinyl halide resin compositions may be prepared by any convenient procedure. It is generally preferred to blend the stabilizer with the vinyl halide resin using plastic mixing rolls at a temperature at which the mix is fluid and to mill the composition on a two-roll mill at from 300° F. to 400° F. for a time sufficient to form a homogeneous sheet. The plasticizer, if one is employed, and other additives may be incorporated with the stabilizer. The stabilized composition may then be removed from the mill in the form of a sheet or film of the desired thickness which may be used as such or subjected to a polishing or embossing treatment.

The invention is further illustrated by the examples that follow. In these examples all parts and percentages are parts by weight and percentages by weight.

posure to ultraviolet radiation was determined by placing 1 x 1 inch specimens that had been cut from the milled sheet in an Ultraviolet Degradation Accelerometer and removing specimens periodically until considerable degradation had occurred as indicated by color change.

In Tables I and II a numerical scale is used to describe the color of the samples with a rating of 1 denoting very pale yellow and a rating of 12 denoting very dark brown or black. The numbers used in the tables correspond to the numbers of the Gardner Color Comparator.

TABLE I

| Ex. No. | Stabilizer | Color after indicated number of hours in Ultraviolet Degradation Accelerometer | | | | | | | |
|---|---|---|---|---|---|---|---|---|---|
| | | 0 | 119 | 214 | 259 | 276 | 317 | 414 | 510 |
| 3A | Di-n-butyltin bis (monobutenyl maleate) | 2 | 2+ | 3 | 3 | 3 | 4 | 5 | 7 |
| 3B | Di-n-butyltin bis (monocinnamyl maleate) | 2 | 3 | 4 | 4 | 4 | 5 | 6 | 8 |
| Comp. Ex. 1 | Di-n-butyltin bis (monobutyl maleate) | 2 | 4 | 6 | 7 | 7 | 9 | 12 | 12 |
| Comp. Ex. 2 | Di-n-butyltin bis (monodecyl maleate) | 2 | 3 | 5 | 6 | 7 | 9 | 11 | 12 |

EXAMPLE 1

To a mixture of 50.5 grams (0.70 mole) of crotyl alcohol (2-buten-1-ol) and 50.0 grams of benzene was added 68.7 grams (0.70 mole) of maleic anhydride. This mixture was heated at 70°–100° C. for one hour and then cooled to 60° C. To this reaction mixture was added 87.1 grams (0.35 mole) of di-n-butyltin oxide. The reaction mixture was heated at its reflux temperature until 6.0 ml. of water had been collected in the Dean-Stark water trap. The benzene was removed by distillation under atmospheric pressure, and the product was filtered. The di-n-butyltin bis (monobutenyl maleate) obtained was a clear, pale yellow liquid that contained 20.8 percent Sn.

EXAMPLE 2

To a mixture of 77.2 grams (0.58 mole) of cinnamyl alcohol (3-phenyl-2-propen-1-ol) and 50.0 grams of benzene was added 56.4 grams (0.58 mole) of maleic anhydride. This mixture was heated at 70°–100° C. for one hour and then cooled to 60° C. To the reaction mixture was added 71.5 grams (0.29 mole) of di-n-butyltin oxide. The reaction mixture was heated at its reflux temperature until 4.5 ml. of water had been collected in the Dean-Stark water trap. The benzene was removed by distillation under atmospheric pressure, and the product was filtered. Upon cooling, the di-n-butyltin bis (monocinnamyl maleate) became a clear, yellow, glassy solid. It contained 17.0 percent Sn.

EXAMPLE 3

To a mixture of 100 parts of polyvinyl chloride (Tenneco 10R), 15 parts of an acrylonitrile-butadiene-styrene terpolymer (Blendex 401), 4 parts of polyacrylonitrile (Acryloid K–120N), 1.35 parts of glyceryl monoricinoleate, and 0.5 parts of stearyl stearate was added 2.8 parts of one of the stabilizers of this invention or a comparative stabilizer.

The mixtures were blended at room temperature and then charged to a two-roll, steam-heated mill whose roll surface was maintained at 340° F. The mixtures were milled for 5 minutes and then removed from the mill as flexible, homogeneous sheets 45 mils thick. The resistance of the compositions to degradation resulting from ex- In each case it was found that increasing discoloration was also indicative of increasing embrittlement of the specimens.

The heat stability of the compositions was determined by placing 1 x 1 inch specimens that had been cut from the milled sheets in forced-circulation ovens at 350° F. and at 375° F. and removing specimens periodically until degradation was complete as indicated by color change. The compositions of this invention and the comparative compositions had excellent long term heat stability; the compositions of this invention (Ex. No. 3A and 3B) were superior in early color hold (10 to 50 minutes at both temperatures) to the comparative compositions.

EXAMPLE 4

To a mixture of 100 parts of polyvinyl chloride (Tenneco 200) and 0.2 part of wax was added 2.8 parts of either a stabilizer of this invention or a comparative stabilizer. The wax component was made up of equal parts of synthetic long chain fatty acids partially saponified with calcium (Hoechst Wax GL–3) and an ester of montan wax partially saponified with calcium (Hoechst Wax OP). The mixtures were blended at room temperature and then charged to a two-roll, steam-heated mill whose surface was maintained at 340° F. The mixtures were milled for 5 minutes and then removed from the rolls as flexible, homogeneous sheets, 45 mils thick. The resistance of the compositions to degradation resulting from exposure to ultraviolet radiation was determined by the procedure described in Example 3. The results obtained are summarized in Table II.

TABLE II

| Ex. No. | Stabilizer | Color after indicated number of hours in Ultraviolet Degradation Accelerometer | | | | | | | |
|---|---|---|---|---|---|---|---|---|---|
| | | 0 | 70 | 90 | 165 | 186 | 327 | 395 | 700 |
| 4A | Di-n-butyltin bis (monobutenyl maleate) | 1 | 1+ | 1+ | 2 | 2 | 2+ | 3+ | (1) |
| Comp. Ex. 3 | Di-n-butyltin bis (monocyclohexyl maleate) | 1 | 2+ | 3 | 4 | 4 | 6 | 8 | 12 |
| Comp. Ex. 4 | Di-n-butyltin bis (monostearyl maleate) | 1 | 2 | 3 | 3+ | 4 | 6 | 9 | 12 |
| Comp. Ex. 5 | Di-n-butyltin bis (monobutyl maleate) | 1 | 2+ | 3 | 4 | 4 | 5 | 8 | 12 |

[1] Light green.

From the data in Tables I and II it will be seen that the compounds of this invention are very effective as ultraviolet light stabilizers for polyvinyl chloride resin compositions (Ex. No. 3A, 3B, and 4A) and that they retain their activity as stabilizers over a far longer period than do the comparative stabilizers, each of which is a closely-related organotin compound (Comp. Ex. 1–5).

Each of the other organotin compounds of this invention can be used in a similar manner in the production of heat and light stable polyvinyl chloride resin compositions.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. An organotin compound having the structural formula

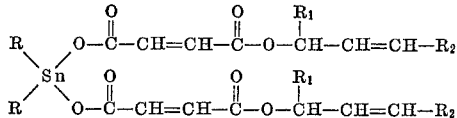

wherein each R represents phenyl or an alkyl group having from 4 to 8 carbon atoms; each $R_1$ represents hydrogen or an alkyl group having from 1 to 4 carbon atoms; and each $R_2$ represents methyl or phenyl.

2. An organotin compound as set forth in claim 1 wherein each R represents n-butyl, each $R_1$ represents hydrogen, and each $R_2$ represents methyl.

3. An organotin compound as set forth in claim 1 wherein each R represents n-butyl, each $R_1$ represents hydrogen, and each $R_2$ represents phenyl.

4. An organotin compound as set forth in claim 1 wherein each R represents n-butyl, each $R_1$ represents ethyl, and each $R_2$ represents methyl.

References Cited
UNITED STATES PATENTS

| | | | |
|---|---|---|---|
| 3,296,289 | 1/1967 | Gloskey | 260—429.7 |
| 2,857,413 | 10/1958 | Weinberg | 260—429.7 |

TOBIAS E. LEVOW, Primary Examiner

W. F. W. BELLAMY, Assistant Examiner

U.S. Cl. X.R.

260—45.75 K